(12) United States Patent
Glab et al.

(10) Patent No.: US 6,450,921 B1
(45) Date of Patent: Sep. 17, 2002

(54) SYSTEM AND METHOD FOR CONTROLLING A TRANSFER CASE CLUTCH ASSEMBLY

(75) Inventors: John Glab, Riverview; Ashok Rodrigues, Canton, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 74 days.

(21) Appl. No.: 09/686,708

(22) Filed: Oct. 11, 2000

(51) Int. Cl.$^7$ ................................................ B60K 41/02
(52) U.S. Cl. ........................ 477/174; 175/176; 175/179
(58) Field of Search ................................ 477/174, 175, 477/176, 179

(56) References Cited

U.S. PATENT DOCUMENTS 4,991,678 A * 2/1991 Furuya ........................ 180/97
5,461,568 A * 10/1995 Morita .................... 364/426.03
5,947,224 A * 9/1999 Kouno ........................ 180/248
5,954,778 A * 9/1999 Rodrigues et al. ............. 701/69

\* cited by examiner

*Primary Examiner*—Sherry Estremsky
*Assistant Examiner*—Eric M Williams
(74) *Attorney, Agent, or Firm*—Frank G. McKenzie

(57) ABSTRACT

A system 10 for controlling a transfer case clutch assembly is provided and is deployed within a four-wheel drive vehicle having a front driveshaft 22, a rear driveshaft 26, and a transfer case 32 which selectively provides torque to the driveshafts 22, 26 by way of a clutch assembly 38. System 10 includes a controller 40 which is communicatively coupled to the clutch assembly 38. Controller 40 receives signals generated by sensors 44–48, utilizes the received signals to determine the onset of a slip condition, and based upon this determination, generates a command signal to selectively activate the clutch assembly 38 effective to smoothly release torque from the front driveshaft 22 and/or rear driveshaft 26.

15 Claims, 4 Drawing Sheets

SYSTEM AND METHOD FOR CONTROLLING A TRANSFER CASE CLUTCH ASSEMBLY

FIELD OF THE INVENTION

This invention relates to a system and method for controlling a clutch assembly and more particularly, to a system and method for controlling a transfer case clutch assembly which provides for a relatively smooth release of torque from the front and/or rear driveshafts of the vehicle.

BACKGROUND OF THE INVENTION

Four-wheel drive vehicles typically include a transfer case which selectively transfers torque and power from the vehicle's input shaft to a front and a rear driveshaft, thereby selectively rotating the front and rear driveshafts. The transfer case includes a conventional electromagnetic clutch assembly which typically and selectively transfers torque from a primary driveshaft (e.g., the rear driveshaft) to a secondary driveshaft (e.g., the front driveshaft), thereby reducing the torque provided to the primary driveshaft and increasing the torque provided to the secondary driveshaft. The clutch assembly is typically and communicatively coupled to a controller which determines the amount of torque that is to be provided to the front and rear driveshafts based upon vehicle sensory data, and which generates a command signal to the clutch assembly, thereby controlling the amount of torque which is provided to front and rear driveshafts.

Under certain circumstances and/or vehicle operating conditions, it is desirable to "release" or disengage the clutch assembly to reduce the amount of torque which is being provided to the front and/or rear driveshaft, in order to avoid relative slip between the front and rear wheels of the vehicle. During these "releases", the clutch assembly often enters into an undesirable cycling or "slipping" condition that results in noise and vibration harshness ("NVH") problems, which are perceived by the operator and/or passengers of the vehicle. Additionally, these undesirable cycling or "slipping" conditions cause premature wear to the clutch assembly, thereby reducing the operating life of the clutch assembly.

There is therefore a need for a system and method for controlling a clutch assembly within the transfer case of a four-wheel drive vehicle which allows the clutch assembly to release torque from the front and/or rear driveshafts of the vehicle in a relatively smooth manner, and which does not result in NVH problems or in premature wear to the clutch assembly.

SUMMARY OF THE INVENTION

It is a first object of the invention to provide a system and a method for controlling a clutch assembly which overcomes at least some of the previously delineated drawbacks of the prior systems, devices, and/or methods.

It is a second object of the invention to provide a method and a system for controlling a clutch assembly located within the transfer case of a four-wheel drive vehicle which allows torque to be released from the front and/or rear driveshafts of the vehicle in a relatively smooth manner and which substantially prevents undesirable and unnecessary cycling of the clutch assembly.

It is a third object of the invention to provide a system and a method for controlling a clutch assembly located within the transfer case of a four-wheel drive vehicle which allows the clutch assembly to be relatively rapidly "released" or disengaged in a manner which does not result in undesirable NVH problems or in unnecessary wear of the clutch assembly.

According to one aspect of the present invention a system for controlling a clutch assembly is provided. The clutch assembly is operatively disposed within a four-wheel drive vehicle and is effective to transfer torque between a front driveshaft and a rear driveshaft. The system includes a first sensor which measures a first speed of the front driveshaft and which generates a first signal based upon the first speed; a second sensor which measures a second speed of the second driveshaft and which generates a second signal based upon the second speed; and a controller which is communicatively coupled to the clutch assembly and which receives the first and second signals. The controller generates a first output signal based upon the first and second signals, and is further effective to determine whether a slip condition is likely to occur within the clutch assembly based upon the value of the first output signal, to selectively transmit the first output signal to the clutch assembly only if a slip condition is not likely to occur within the clutch assembly, and to generate and selectively transmit a second output signal to the clutch assembly effective to smoothly release the clutch assembly if a slip condition is likely to occur within the clutch assembly.

According to a second aspect of the present invention, a method for controlling a transfer case clutch assembly is provided. The method includes the steps of: providing a controller which generates a first clutch output signal; determining whether the first clutch output signal has exceeded an initial threshold value for a predetermined period of time; selectively transmitting the first clutch output signal to the transfer case clutch assembly if the first clutch output signal has not exceeded the initial threshold value for the predetermined period of time; determining whether the first clutch output signal has fallen below a second threshold value; selectively transmitting the first clutch output signal to the transfer case clutch assembly if the first clutch output signal has not fallen below the second threshold value; and selectively transmitting a second clutch output signal to the transfer case clutch assembly if the first clutch output signal has exceeded the first threshold value for the predetermined period of time and has subsequently fallen below the second threshold value, the second signal being effective to selectively and relatively smoothly disengage the clutch assembly.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
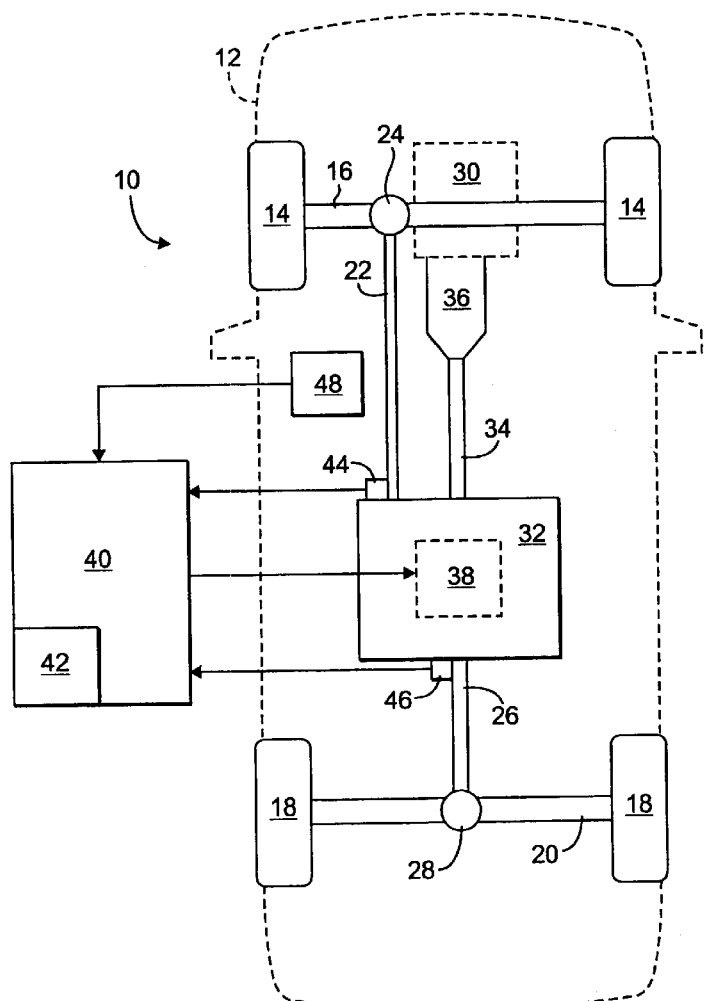
FIG. 1 is a schematic diagram of a four-wheel drive vehicle including an apparatus for releasing a clutch assembly which incorporates the teachings of the preferred embodiment of the invention and employed on a vehicle.

Referring now to FIG. 1, there is shown a transfer case control system or apparatus 10 made in accordance with the teachings of the preferred embodiment of the invention. As shown, system 10 is deployed upon a four-wheel drive vehicle having a pair of front wheels 14 which are operatively mounted upon a front axle 16, and a pair of rear wheels 18 which are operatively mounted upon a rear axle 20. Front axle 16 is operatively coupled to and receives torque and power from a front driveshaft 22 through a front differential assembly 24, and rear axle 20 is operatively coupled to and receives torque and power from a rear driveshaft 26 through a rear differential assembly 28.

Front and rear driveshafts 22, 26 selectively receive torque and power from the vehicle engine 30 through the transfer case 32. Particularly, torque and/or power generated by the engine 30 is delivered to transfer case 32 through an input shaft 34 which is coupled to the transmission system or assembly 36. Rear driveshaft 26 is coupled to the transmission assembly 36 and continuously receives torque from the input shaft 34. Transfer case 32 includes a conventional electromagnetic clutch assembly 38 which selectively transfers torque to the front driveshaft 22, thereby reducing the torque supplied to the rear driveshaft 26. In the preferred embodiment of the invention, clutch assembly 38 is a conventional "on-demand" type clutch assembly. It should be appreciated that the terms "front" and "rear" are used herein for convenience purposes only (e.g., to respectively refer to a secondary and primary driveshaft), and in alternate embodiments of the invention, the front and rear driveshafts may be interchanged (e.g., the front driveshaft may act as the primary driveshaft).

Transfer case control system 10 includes a conventional microcontroller or controller 40 having a memory unit 42 and operating under stored program control. Controller 40 is electrically, physically, and communicatively coupled to sensors 44, 46, 48, and to clutch assembly 38. As described more fully and completely below, controller 40 receives signals generated by sensors 44–48, processes and utilizes the received signals to determine the amount of torque which is to be respectively provided to front and rear driveshafts 22, 26, and based upon this determination, generates a command signal to selectively activate, engage, and/or disengage the clutch assembly 38. The controller 40 is further effective to detect the onset of a slip condition or an undesirable clutch cycling condition and, based upon this determination, to generate a torque release signal to clutch assembly 38, thereby smoothly releasing torque from the front driveshaft 22 and/or rear driveshaft 26.

In the preferred embodiment, controller 40 is a conventional powertrain controller including one or more microprocessors which cooperatively perform the below-described calculations and/or processes. Controller 40 generates a pulse-width-modulated ("PWM") signal which controls the amount of slippage between plates of the clutch assembly 38, thereby controlling the amount of torque and/or power which is transferred to front driveshaft 22 and the rear driveshaft 26 from the input shaft 34. Particularly, the duty cycle of the PWM signal (i.e., the amount or percentage of a signal period in which the signal is active or "enabled") controls the amount of torque which is being transferred to the respective driveshafts 22, 26. The output signal of the controller 40 to the clutch assembly 38 is interchangeably referred to herein as a "duty cycle" output and/or as "torque" output.

In the preferred embodiment of the invention, memory 42 is a conventional memory unit including both permanent and temporary memory, and is adapted to and does store at least a portion of the operating software which directs the operation of controller 40. Moreover, memory 42 is adapted to selectively store other types of data or information, including information associated with the operation of the preferred embodiment of the invention and/or associated historical data, processing data, and/or operational data. As will be more fully discussed below, examples of such data include, but are not limited to, data relating to the speed of driveshafts 22, 26, data relating to current and past engine operating conditions and events, vehicle acceleration, engine speed, and other engine operating data which are used by controller 40 to determine the amount of torque that should be provided to driveshafts 22, 26 and whether clutch assembly 38 should release and/or reduce the torque which is provided to driveshaft 22 and/or 26. Memory 42 also stores various values which are utilized within the torque release strategy or profile, such as "start delay" periods of time, "overshoot" and "undershoot" values, "delay" values, and decrement values. As should also be apparent to those of ordinary skill in the art, controller 40 and memory 42 may actually comprise several commercially available, conventional, and disparate chips or devices which are operatively and communicatively linked in a cooperative manner.

Sensors 44 and 46 comprise conventional and commercially available sensors which respectively measure the rotational speed of the front driveshaft 22 and the rear driveshaft 26 and which each generate and communicate a signal representing each of these measured speeds to controller 40. In an alternate embodiment, sensors 44, 46 can be replaced with wheel speed sensors. Sensors 48 comprise a plurality of conventional and commercially available sensors which measure and/or acquire engine operating data or information. In the preferred embodiment of the invention, sensors 48 include one or more conventional engine or vehicle speed and/or acceleration sensors, one or more vehicle throttle position sensors, and one or more "fault" detection sensors, which detect faults or abnormalities in the operation of the engine or in the operation of the other components of vehicle 12.

Sensors 44–48 provide data representing the above-delineated measured values to controller 40, which utilizes these values, in a known and conventional manner, to generate a PWM signal to clutch assembly 38, thereby selectively controlling the power and torque which are provided to driveshafts 22 and 26. It should be appreciated that sensors 44–48 may include filtering and/or processing devices or circuits (e.g., low pass, high pass, and/or band pass filters) which filter and/or process the measured or sensed data prior to sending the data to controller 40.

Figure 2:
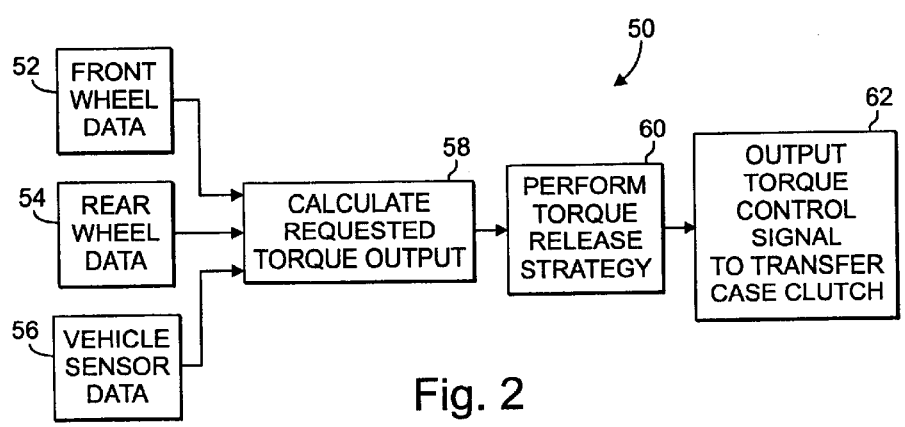
FIG. 2 is a block diagram illustrating the broad functionality of the system shown in FIG. 1.

To understand the general operation of system 10, reference is now made to flow chart 50 of FIG. 2, illustrating the broad functionality of system 10. As shown, data 52 represents the speed of the front wheels 14, which is derived in a known manner from the measurements taken by sensor 44. Particularly, controller 40 processes drive shaft speed data received from sensor 44 and uses conventional algorithms and/or equations to determine and/or estimate the speed of the vehicle's front wheels 14. Data 54 represents the speed of the rear wheels 18, which is derived in a known manner from the measurements taken by sensor 46 (i.e., in a manner substantially identical to that described with respect to data 52). Data 56 represents other vehicle operation condition data (e.g., throttle position data), which is measured and/or processed by sensors 48.

As illustrated in block 58, controller 40 utilizes data 52–56 in an known and conventional manner to determine the torque that is to be provided to each of driveshafts 22 and 26 (e.g., controller 40 calculates the duty cycle of the PWM signal which is to be communicated to clutch assembly 38). This "potential" or "requested" torque output or duty cycle output is analyzed through a torque release strategy, procedure, or subroutine, illustrated in block 60, which determines the actual torque or duty cycle which is output to clutch assembly 38. Particularly, as described more fully and completely below, controller 40 determines whether a rapid disengagement of clutch 38 or a "torque event" (e.g., a release of torque which could cause undesirable cycling and/or slippage of the clutch assembly 38 and/or NVH problems) is possible or likely to occur, and if such a determination is made, controller 40 transmits a modified or different output control signal to clutch assembly 38 which is derived according to a predetermined and/or calculated profile and/or algorithm. In this manner, system 10 ensures a relatively smooth release of torque by clutch assembly 38.

Figure 3:
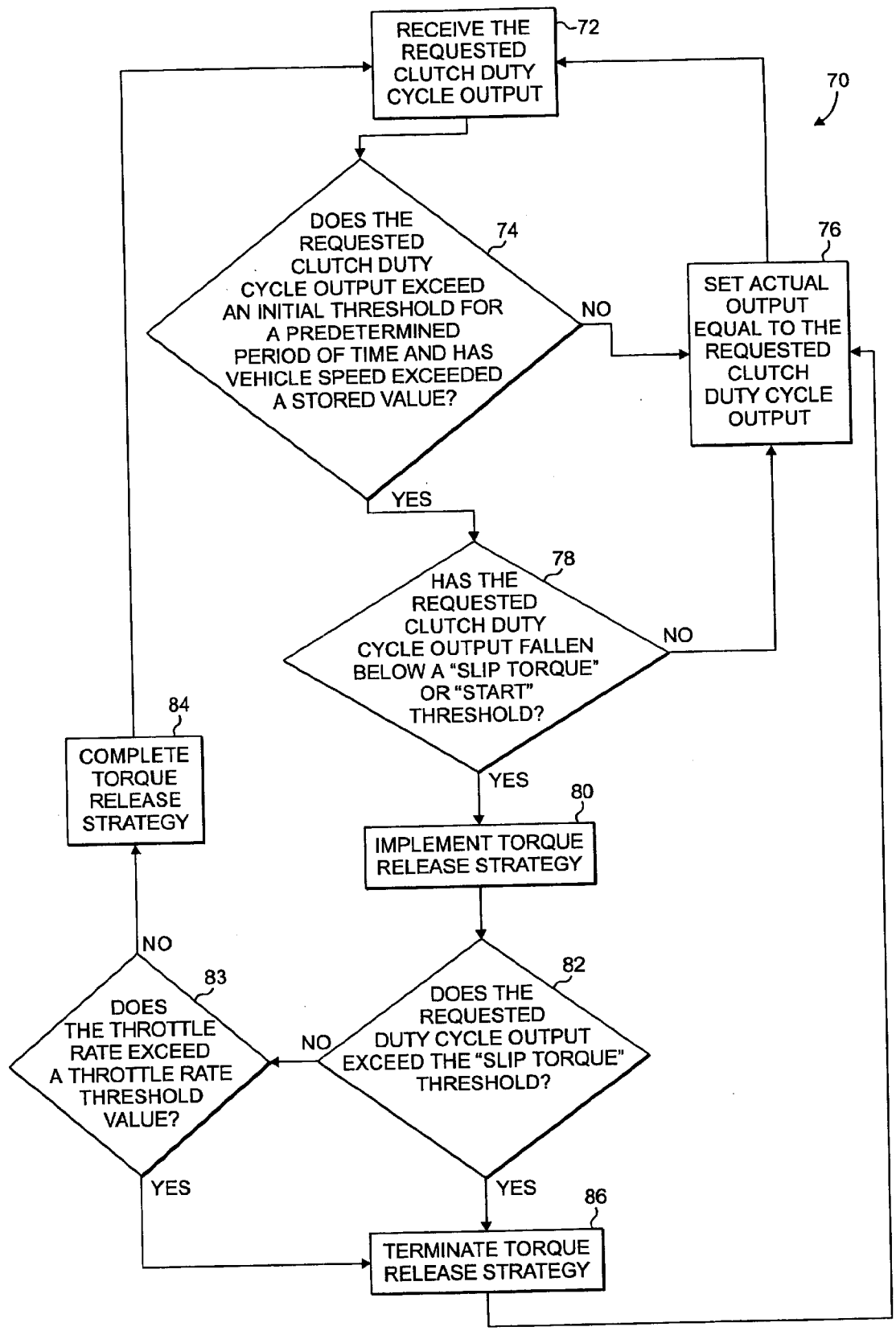
FIG. 3 is a block diagram illustrating the detailed operational functionality of the system shown in FIG. 1.

To more fully understand the operational functionality of the preferred embodiment of system 10, reference is now made to the operational flow diagram or "flow chart" 70 of FIG. 3. As shown in functional block or step 72 of flow diagram 70, system 10 receives or senses the requested clutch duty cycle output signal that is to be communicated to clutch assembly 38. In functional block or step 74, controller 40 determines whether the requested clutch duty cycle exceeds a predetermined initial threshold for a predetermined period of time. In the preferred embodiment of the invention, the controller 40 further determines whether the vehicle's speed exceeds a predetermined or stored speed threshold value. If the requested clutch duty cycle does not exceed the initial threshold value for a predetermined period of time or if the vehicle's speed does not exceed the speed threshold value, the actual clutch duty cycle or torque, which is outputted or communicated to clutch assembly 38, is "set" or made equal to the requested clutch duty cycle, as shown in functional block or step 76. Controller 40 then returns to functional block or step 72. Alternatively, controller 40 proceeds to functional block or step 78, where controller 40 detects or determines whether the requested clutch duty cycle has fallen below a predetermined "slip torque" or "start" threshold value.

In the preferred embodiment of the invention, the "slip torque" or start threshold value is defined in terms of duty cycle percentage, and is established through testing data which is acquired from the type of transfer case or clutch assembly which is being controlled. In one non-limiting embodiment, the transfer case is tested by introducing a maximum torque condition within the transfer case, and then performing a controlled torque release. The system is then monitored for a threshold "slip torque" point (e.g., a value in which the clutch enters into a undesirable cycling or "slipping" condition). A production variability factor is added to the measured "slip torque" point to provide the "slip torque" or "start" threshold duty cycle value.

If the requested clutch duty cycle does not fall below the slip torque threshold, controller 40 proceeds to block 76, where the actual torque or duty cycle outputted or communicated to the clutch assembly 38 is made equal to the requested torque duty cycle. Otherwise, controller 40 implements the torque release strategy or procedure which is illustrated in functional block or step 80 and which is described more fully and completely below. As illustrated in functional blocks or steps 82, 83 and 86, the torque release strategy or procedure will be terminated if, at any time during the strategy or procedure, the requested duty cycle output exceeds the "start" threshold value, or if the vehicle's throttle rate exceeds a throttle rate threshold value. When the torque release strategy is terminated, controller 40 returns to functional block or step 76 and the actual torque or duty cycle output is again made or set equal to the requested clutch duty cycle output. If neither of these conditions occur (e.g., if the requested clutch duty cycle output does not exceed the start threshold value and the vehicle's throttle rate does not exceed the throttle rate threshold value), the torque release strategy is completed, as illustrated in functional block or step 84, and controller 40 returns to step 72.

Figure 4:
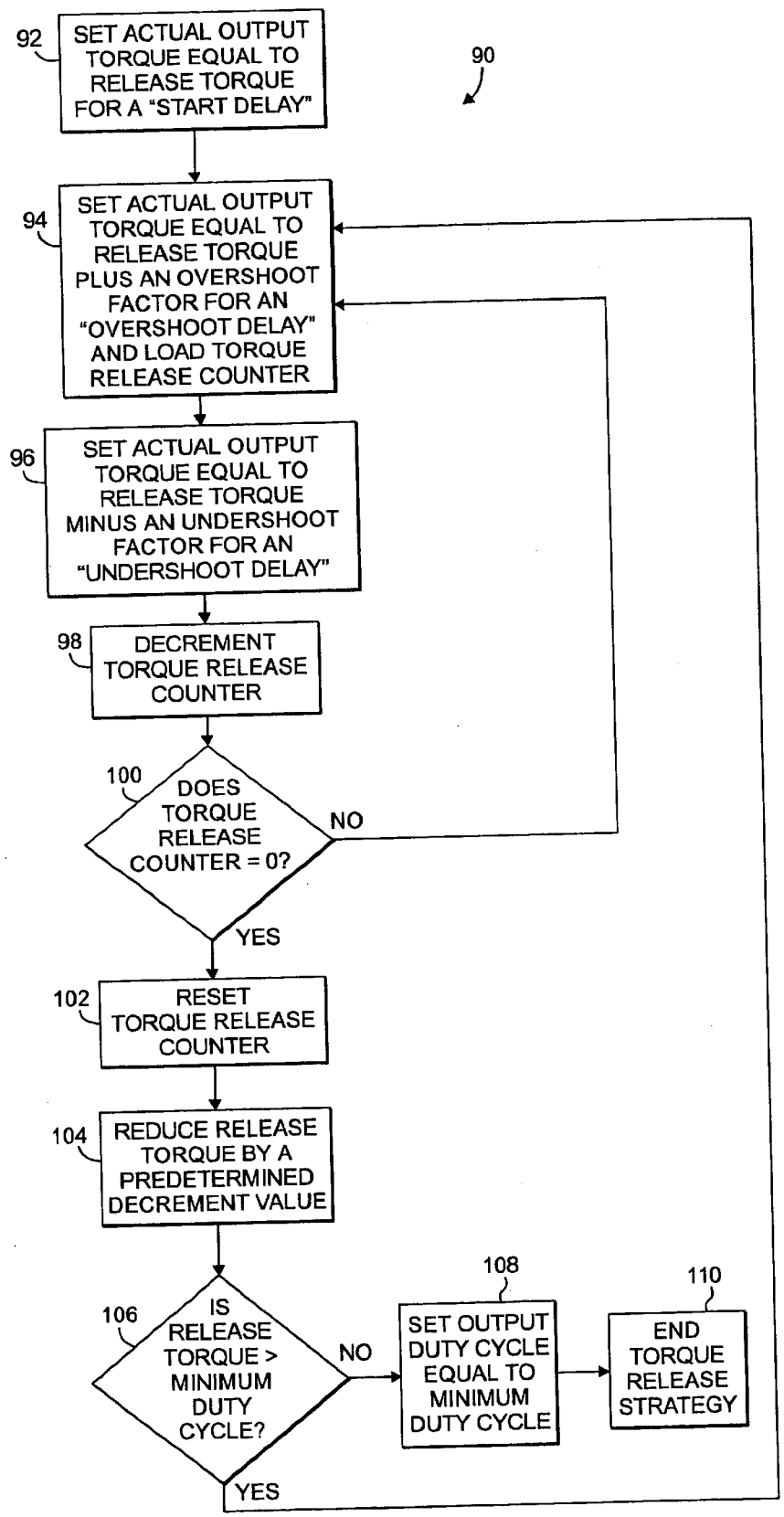
FIG. 4 is a block diagram illustrating the functionality of the torque release strategy utilized by the system shown in FIG. 1.
Figure 5:
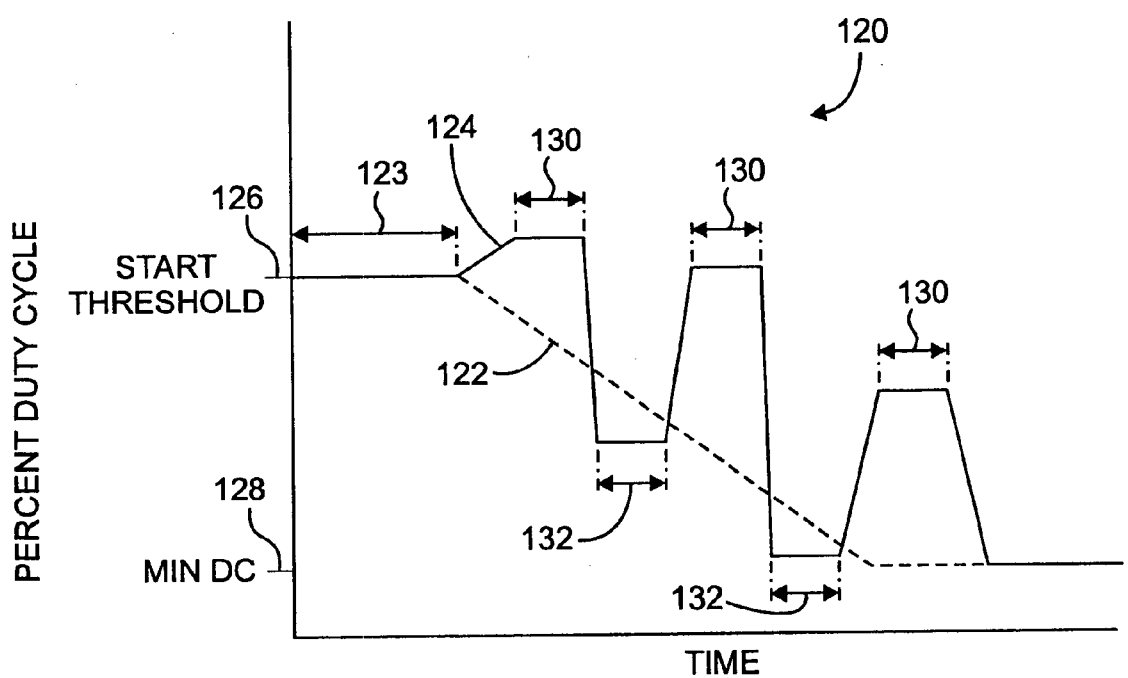
FIG. 5 is a graph illustrating the torque release strategy utilized by the system shown in FIG. 1.

Referring now to FIG. 4, there is shown a block or flow diagram 90 illustrating the functionality of the torque release strategy or procedure which is utilized or executed by system 10. When the torque release strategy begins, the actual output torque or duty cycle signal is set or made equal to a "release torque" reference function or profile for a predetermined period of time or a "start delay," as shown in functional block or step 92. The "release torque" reference function or profile is a predetermined set of values which is stored within memory 42, and which ranges from a maximum value which is equal to the "start" threshold value to a minimum value which is equal to the minimum possible duty cycle that can be achieved by system 10 (e.g., representing a complete release of clutch assembly 38). In one non-limiting embodiment, the "release torque reference" function is represented by the curve 122 illustrated in graph 120 of FIG. 5. As shown in graph 120, the actual torque output, which is illustrated as curve 124, is equal to curve 122 for the "start delay" or period of time 123. During start delay 123, release torque reference 122 is set equal to the value 126 of the "start" threshold duty cycle.

After the "start delay" time expires, controller 40 increases the actual output torque or duty cycle until it is equal to the release torque profile plus a predetermined overshoot factor or percentage value which is stored within memory 42, as illustrated in functional block or step 94. Additionally, in step 94, a torque release counter within controller 40 and/or memory 42 is pre-set with a desired number of cycles which can be based upon various vehicle operating parameters. As shown in graph 120, the actual output torque or duty cycle is held at this value for an "overshoot" delay or a predetermined period of time 130. After the overshoot delay expires, actual output torque or duty cycle is decreased to a value equal to the release torque reference minus a predetermined undershoot factor or percentage value which is stored within memory 42, as illustrated in functional block or step 96. As shown in graph 120, the actual output torque or duty cycle is held at this value for an "undershoot" delay or a predetermined period of time 132.

In functional block or step 98, the torque release counter is decremented by one. The beginning value of the torque release counter is equal to a predetermined integer value which is stored within memory 42. If the torque release counter does not equal zero, functional blocks or steps 94–98 are repeated until the torque release counter equals zero, as illustrated by functional block or step 100. Once the torque release counter equals zero, controller 40 proceeds to functional block or step 102 and resets the torque release counter. In functional block or step 104, the current release torque value is reduced by a predetermined release torque decrement value which is stored within memory 42. If the resulting "reduced" release torque is greater than a predetermined minimum duty cycle value, functional blocks or steps 94 through 106 are repeated. If the resulting "reduced"

release torque is not greater than the minimum duty cycle value, which is illustrated as value 128 in graph 120, controller 40 proceeds to functional block or step 108 and sets the actual duty cycle output signal equal to the minimum duty cycle value 128. Once the actual duty cycle output has been made or set equal to the minimum duty cycle, the torque release strategy is terminated or completed, as illustrated by functional block or step 110.

It should be appreciated that by "overshooting", "undershooting" and decrementing the torque release reference in the above-described manner, system 10 ensures that the clutch assembly 38 is "released" or disengaged in a relatively smooth manner, thereby substantially preventing undesirable NVH problems or unnecessary wear of the clutch assembly 38. It should further be appreciated that the above-described functional steps may be performed in a different order or procedure, and may include other additional control and/or slip prevention subroutines and/or procedures which are used in conjunction with the functional steps described herein.

It is understood that the various inventions are not limited to the exact construction illustrated and described above, but that these previously delineated inventions may be varied without departing from the scope of the inventions as described in the following claims.

What is claimed is:

1. A system for controlling a clutch assembly, said clutch assembly being operatively disposed within a four-wheel drive vehicle and being effective to transfer torque between a front driveshaft and a rear driveshaft, said system comprising:
   a first sensor which measures a first speed of said front driveshaft and which generates a first signal based upon said first speed;
   a second sensor which measures a second speed of said rear driveshaft and which generates a second signal based upon said second speed; and
   a controller which is communicatively coupled to said clutch assembly and which receives said first and second signals and which generates a first output signal based upon said first and second signals, said controller being further effective to determine whether a slip condition is likely to occur within said clutch assembly based upon said value of said first output signal, to selectively transmit said first output signal to said clutch assembly only if a slip condition is not likely to occur within said clutch assembly, and to generate and selectively transmit a second output signal to said clutch assembly effective to smoothly release said clutch assembly if a slip condition is likely to occur within said clutch assembly.

2. The system of claim 1 wherein said second output signal is by use of a predetermined torque release function, at least one overshoot value and at least one undershoot value.

3. The system of claim 1 wherein said controller determines whether a slip condition is likely to occur within said clutch assembly by comparing said first output signal to a predetermined threshold value for a predetermined period of time.

4. The system of claim 3 wherein said controller selectively transmits said second output signal over a first period of time.

5. The system of claim 4 wherein said controller is further adapted to cease transmitting said second output signal when said first output signal exceeds said threshold value.

6. The system of claim 5 further comprising:
   a throttle position sensor which is communicatively coupled to said controller and measures throttle position value data and which generates a throttle position signal to said controller;
   said controller being further adapted to receive said throttle position signal, calculate a throttle rate value, and cease transmitting said second output signal if said throttle rate value exceeds a throttle rate threshold value.

7. The system of claim 1 wherein said first and said second output signals each comprises a duty cycle percentage value.

8. A method for controlling a transfer case clutch assembly within a vehicle, said method comprising the steps of:
   providing a controller which generates a first clutch output signal;
   determining whether said first clutch output signal has exceeded an initial threshold value for a predetermined period of time;
   selectively transmitting said first clutch output signal to said transfer case clutch assembly if said first clutch output signal has not exceeded said initial threshold value for said predetermined period of time;
   determining whether said first clutch output signal has fallen below a second threshold value;
   selectively transmitting said first clutch output signal to said transfer case clutch assembly if said first clutch output signal has not fallen below said second threshold value; and
   selectively transmitting a second clutch output signal to said transfer case clutch assembly if said first clutch output signal has exceeded said first threshold value for said predetermined period of time and has subsequently fallen below said second threshold value, said second signal being effective to selectively and relatively smoothly disengage said clutch assembly.

9. The method of claim 8 wherein said first threshold value equals said second threshold value.

10. The method of claim 8 wherein said second clutch output signal is calculated by use of a reference function.

11. The method of claim 10 wherein said second clutch output signal is equal to said reference function for a first period of time, is equal to said reference function plus an overshoot value for a second period of time, and is equal to said reference function minus an undershoot value for a third period of time.

12. The method of claim 8 further comprising the step of ceasing to transmit said second clutch output signal to said transfer case clutch assembly if said first clutch output signal exceeds said second threshold value.

13. The method of claim 12 wherein said vehicle further includes a throttle, said method further comprising the steps of:
   calculating a throttle rate value;
   comparing said throttle rate value to a throttle rate threshold value; and
   ceasing to transmit said second clutch output signal if said throttle rate value exceeds said throttle rate threshold value.

14. The method of claim 8 wherein said first clutch output signal and said second clutch output signal each comprise a unique duty cycle percentage.

15. The method of claim 14 wherein said vehicle further includes a front driveshaft and a rear driveshaft, and wherein said first clutch output signal and said second clutch output signal are each effective to selectively cause said transfer case clutch assembly to provide torque to said first and second driveshafts.

* * * * *